Dec. 7, 1971   G. H. ENDRESS ET AL   3,625,058
APPARATUS FOR DETERMINING THE FILLING LEVEL OF A CONTAINER
Filed July 7, 1969   3 Sheets-Sheet 3

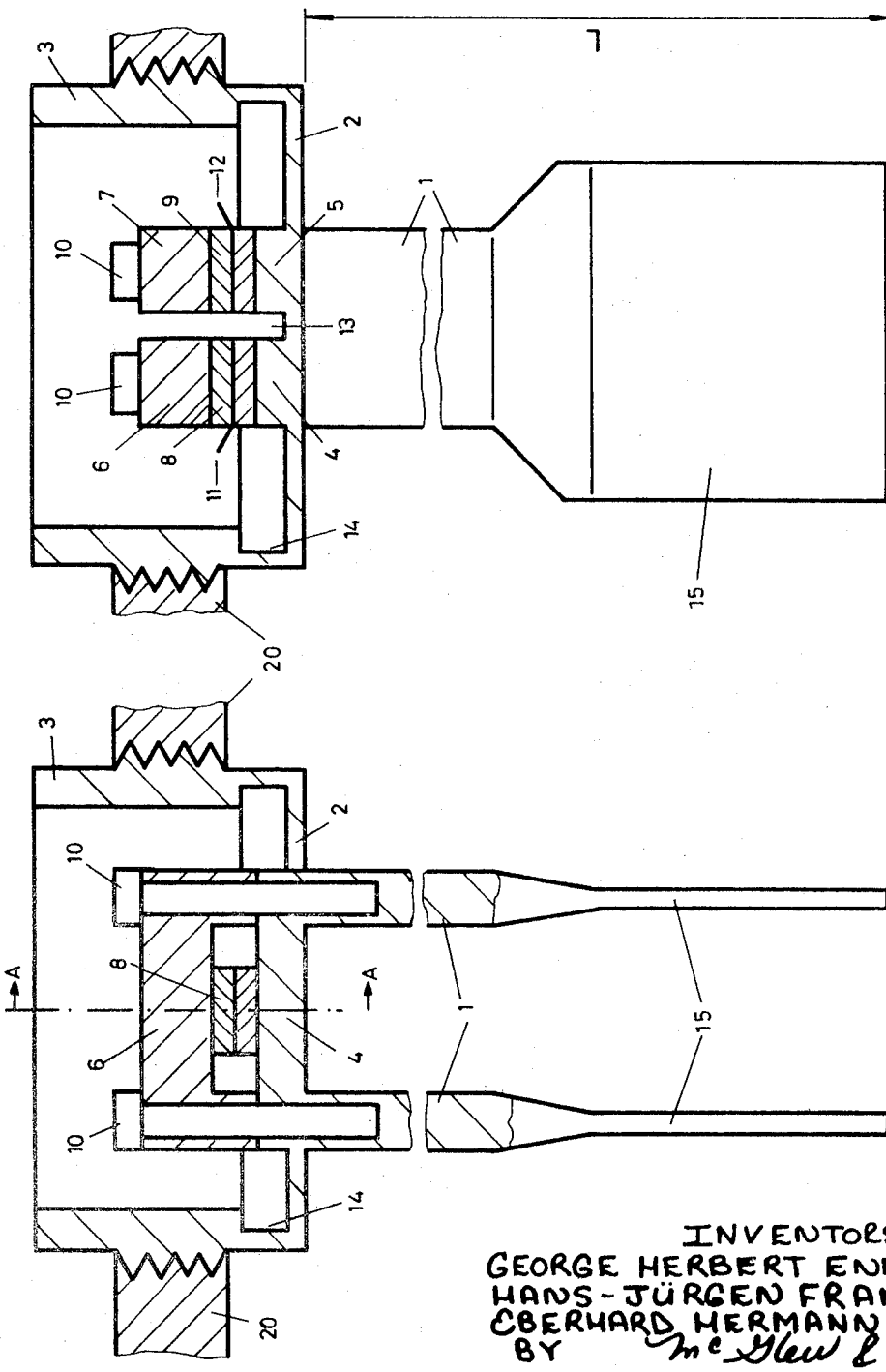

INVENTORS
GEORGE HERBERT ENDRESS
HANS-JÜRGEN FRANZ
EBERHARD HERMANN
BY McGlew & Toren
ATTORNEYS

United States Patent Office 3,625,058
Patented Dec. 7, 1971

3,625,058
APPARATUS FOR DETERMINING THE FILLING LEVEL OF A CONTAINER
George Herbert Endress, Reinach, Basel-Land, Switzerland, and Hans-Jürgen Franz, Fahrnau Baden, and Eberhard Hermann, Eichsel Baden, Germany, assignors to Endress & Hauser G.m.b.H. & Co., Baden, Germany
Filed July 7, 1969, Ser. No. 839,320
Claims priority, application Germany, July 10, 1968, P 17 73 815.7
Int. Cl. G01f 23/00; G05d 11/13
U.S. Cl. 73—290 V                      11 Claims

ABSTRACT OF THE DISCLOSURE

Apparatus for determining the filling level of a container includes two vibrator elements extending into the container. A first electromechanical transducer excites the elements into parallel vibrations of respective opposing senses, and a second electromechanical transducer transforms the vibrations into electrical signals having amplitudes corresponding to the amplitudes of the vibrations. An amplifier has an input connected to the output of the second electromechanical transducer and an output connected to the first electromechanical transducer and to means providing output signals as a function of the amplitude of the vibrations.

BACKGROUND OF THE INVENTION

A known apparatus for determining the filling level of a container or tank includes a probe having at least one vibratile rod, a device for the excitation of mechanical natural vibrations of the rod, and a device operable to provide indicating and/or switching operations as a function of the amplitude of the vibrations of the vibratile rod.

Apparatus of this type is used, more particularly, where the usual capacitative instruments for measuring the filling level of the tank, cannot be employed because of the low dielectric constant of the material in the tank. Their mode of operation is based on the amplitude of operation of the vibrator rod being relatively great as long as the vibrator rod is in the air, whereas the vibration of the rod is greatly attenuated as soon as the vibrator rod is immersed in the material in the tank. The differing amplitudes of vibration can be detected by suitable means, such as electromechanical transducers, and utilized for triggering indicating or switching processes or both.

In known arrangements of this type, an alternating voltage of fixed frequency, which is usually the alternating voltage of a commercial network, is applied to the excitation device, the natural resonance frequency of the mechanical vibratory system coinciding as closely as possible with the frequency of the alternating voltage. However, these arrangements involve certain problems. In order to be able to maintain the mechanical vibrations without excessive energy consumption, it is necessary to try to make the vibratory system of the highest possible quality. The consequence of this is that the band width of the vibratory system is very narrow, and may well be below one Hz. Therefore, either the electrical excitation voltage must be tuned to this frequency very accurately or, and inversely, the natural resonant frequency must be adapted very accurately to the fixed frequency of the excitation voltage.

As is known, the oscillating frequency of a mechanical vibratory system depends mainly upon the length of the vibrator, the distribution of its mass and the restoring force of its mounting. The natural resonance frequency can be influenced by modifying one or more of these three components. In view of the mentioned narrow band width, this obviously requires very accurate production methods with very close mechanical tolerances.

In addition, the natural resonance frequency of the mechanical vibratory system depends upon various factors which may change during the course of operation. The length of the vibrator and the restoring force of the mounting are temperature-dependent, so that the natural resonance frequency of the system also depends upon temperature. Additionally, the natural resonance frequency of the system can be influenced by contamination of the vibrator rod, because this changes the vibrating mass.

Furthermore, known devices of this type usually have only a single vibrator rod. When this rod is made to vibrate, it exerts considerable alternating forces upon the mounting, which express themselves, where bending vibrations are involved, in the form of a counter turning movement and which must be absorbed by the mounting. Consequently, the mounting for the vibrator rod must be of such mass, and must be so unstressed, as to be able to absorb this counter turning moment. The mass of the mounting, therefore, must be greater by several orders of magnitude than the mass of the vibrator per se. If the mass of the mounting were smaller, it would covibrate, thereby destroying energy. This has the effect of an attenuation of the whole system, and the consequence is a substantial reduction of the sensitivity of the system.

SUMMARY OF THE INVENTION

This invention relates to apparatus for determining the filling level of a container and, more particularly, to an improved and simplified apparatus of this type which, with relatively wide manufacturing tolerances, possesses a good sensitivity which is maintained even under changing operating conditions.

In accordance with the invention, two parallel vibrator rods are provided, and are excited into transverse vibrations with a 180 phase difference by a first electromechanical transducer. A second electromechanical transducer is so disposed that it transforms the vibrations of the two vibrator rods into electrical signals whose amplitude is dependent upon the amplitude of the vibrations. The output of the second electromechanical transducer is connected to the input of an amplifier, and the output of the amplifier is connected to the first electromechanical transducer as well as to the device for triggering indicating or switching processes or both.

The effect of using two vibrator rods in the apparatus is that the counter turning moments produced by the two vibrator rods cancel each other, so that no energy is lost due to vibrations transmitted to the mounting. The mounting then may be of relatively light and inexpensive design. Connecting the two electromechanical transducers through an amplifier results further in a feedback loop which contains the mechanical vibratory system, and through which the system excites itself at all times with its natural resonance, even if this natural resonance frequency changes. Therefore, it is unnecessary to maintain, during manufacture, a certain natural resonance frequency. Further, the sensitivity of the system is not impaired if this natural resonance frequency changes during operation due to temperature fluctuations, contaminations or the like. The only condition therefor is that the band width of the amplifier encompasses the entire range through which the natural resonance frequency changes.

On the other hand, the entire system is very sensitive because the self-excited vibrations stop immediately when the vibrator rods are slightly damped due to immersion into the material contained in the container or tank.

In a first embodiment of the invention, the two vibrator rods are secured at one end to a membrane and are interconnected by two bridging members which are mechanically uncoupled from each other. Each bridging member is coupled to one of the electromechanical transducers. In this case, each of the bridges preferably comprises a yoke resting on the membrane, and a stirrup spanning the yoke, with a piezoelectric element being clamped between the stirrup and the yoke.

In accordance with another embodiment of the invention, one end of each of the two vibrator rods is mounted at two spaced apart locations. A magnetizable armature is disposed between the two bearing points of each of the vibrator rods. The first electromechanical transducer, in this case, is a magnetizing winding acting upon the armature.

An object of the invention is to provide improved apparatus for determining the filling level of a container or tank.

Another object of the invention is to provide an improved apparatus of this type including at least two vibrator elements constituting vibratile means extending into the container.

A further object of the invention is to provide such an apparatus which, with relatively wide manufacturing tolerances, has a good sensitivity which is maintained even under changing operating conditions.

A further object of the invention is to provide such an apparatus including two vibrator rods excited into parallel vibrations, of opposing senses, by a first electromechanical transducer, with a second electromechanical transducer being so disposed as to transform the vibrations of the rods into electrical signals whose amplitude depends upon the amplitude of the vibrations.

Another object of the invention is to provide such an apparatus in which the output of a second electromechanical transducer is connected to the input of an amplifier whose output is connected to the first electromechanical transducer and also to a device for triggering indicating or switching operations, or both.

A further object of the invention is to provide such an apparatus in which, during manufacture thereof, it is unnecessary to maintain a predetermined natural resonance frequency.

Another object of the invention is to provide such an apparatus whose sensitivity is not impaired even if the natural resonance frequency changes during operation.

For an understanding of the principles of the invention, reference is made to the following description of typical embodiments thereof as illustrated in the accompanying drawings.

BRIEF DESCRIPTION OF THE DRAWINGS

In the drawings:

FIG. 1 is a vertical sectional view through a first embodiment of the invention;

FIG. 2 is a vertical sectional view taken along the line A—A of FIG. 1;

DESCRIPTION OF THE PREFERRED EMBODIMENTS

Figure 3:
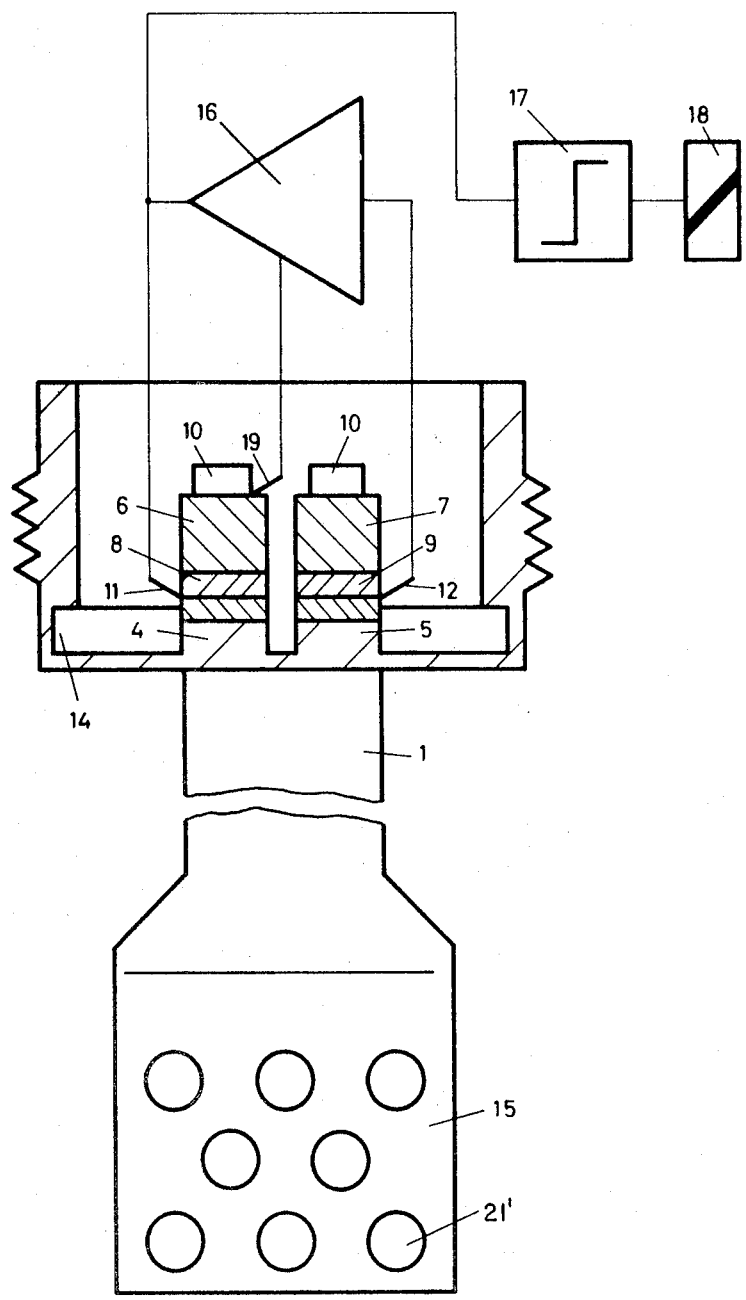
FIG. 3 includes a schematic wiring diagram corresponding to FIGS. 1 and 2.

In the embodiment of the invention shown in FIGS. 1, 2 and 3, two flat vibrator rods 1, of stainless steel are provided. These rods are shown in a greatly shortened condition in FIG. 1, as indicated by the break. Each of the vibrator rods 1 is secured at one end in parallel and mutually spaced relation to a membrane 2 which closes the lower end of a tubular housing 3 with external threads. Housing 3 is screwed into a threaded aperture in a wall 20 of the tank or container whose filling level is to be determined by the apparatus.

Rods 1 are interconnected by two bridging members formed by two parallel and juxtaposed yokes 4 and 5 and two stirrups 6 and 7 spanning these yokes. In the particular embodiment of the invention shown in FIGS. 1, 2 and 3, yokes 4 and 5 are formed integrally with membrane 2. A piezoelectrical element 8 is disposed in the space between yoke 4 and stirrup 6, and a piezoelectrical element 9 is disposed in the space between yoke 5 and stirrup 7, each of these elements being held firmly between the respective yoke and the respective stirrup by screws 10. Each piezoelectric element comprises a pair of piezoelectric ceramic disks provided with silver coatings on opposite sides thereof. Electrodes 11 and 12 are attached to the silver coatings which are in engagement in the center of the piezoelectric elements 8 and 9, while the outer silver coatings of the ceramic disks are in electrical contact with the yoke 4 and stirrup 6, or the yoke 5 and stirrup 7, respectively, and are electrically connected to contact or terminal 19 shown in FIG. 3.

The first electromechanical transducer system, formed by yoke 4, stirrup 6 and piezoelectrical element 8, is mechanically uncoupled from the second electromechanical transducer system, formed by yoke 5, stirrup 7 and piezoelectrical element 9, by the interspace 13 therebetween, so that forces or vibrations cannot be transmitted directly from one transducer system to the other transducer system but only through membrane 2 or vibrator rods 1 connected therewith. Similarly, membrane 2 is mechanically uncoupled from housing 3 due to the provision of an annular recess 14. To increase the sensitivity of the apparatus, that is the energy absorption by damping of the rods in the liquid or lightweight bulk goods in the container, the free ends of vibrator rods 1 are tapered in a downward direction, and these rods end in thinner, blade-shaped enlargements 15.

FIG. 3 includes a schematic wiring diagram of the embodiment of the invention shown in FIGS. 1 and 2. Referring to FIG. 3, electrode 12 of piezoelectric element 9 is connected to the input of an amplifier 16, to whose output the electrode 11 of piezoelectric element 8 is connected. A threshold value discriminator 17 is connected to the output of amplifier 16 and controls a relay 18.

The embodiment of the invention shown in FIGS. 1 and 2 operates in the manner which will now be described. The piezoelectric ceramic disks of each electromechanical transducer are connected in parallel electrically and in series mechanically. When an alternating voltage is applied to piezoelectric element 8, a kind of piston movement occurs, as a result of which there is a flexure of yoke 4. This excites rods 1 into bending vibrations in an opposing sense. In turn, these bending vibrations cause a flexure of stirrup 5, whereby alternating pressures are exerted upon piezoelectric element 9. This results, at the electrode 12, in an electrical alternating voltage of the same frequency as the mechanical vibrations of vibrator rods 1.

This alternating voltage is applied to the input of amplifier 16, is amplified by the latter, and is then applied to the piezoelectrical element 8. Consequently, vibrator rods 1 are excited by an alternating voltage whose frequency matches exactly the natural resonance frequency of the mechanically vibrating system formed, primarily, by rods 1, membrane 2, housing 3 and yokes 4 and 5. If this natural resonance frequency changes, the frequency of the excitation voltage follows this change exactly, provided the band width of amplifier 16 encompasses the range of the change of the frequency. The system substantially always excites itself as soon as amplifier 16 is energized, because even the smallest vibrations of rods 1, which are always present in a high quality structure capable of vibration when the rods are not damped, generate an alternating voltage at the input of amplifier 16 which is adequate for self-excitation.

The whole mechanical-electrical system builds up, in short order, until amplifier 16 is saturated and unable to provide a higher output alternating voltage. At this time, a steady condition is established and rods 1 vibrate with an amplitude depending upon the mechanical quality of the system and the energy supplied by amplifier 16. Thus, there is a state of equilibrium between the energy supplied by amplifier 16 and the energy consumed in the structure which is capable of vibration and in the mounting for the rods. The natural resonance frequency of the system is determined primarily by the length L of the vibrator rods, the cross section of the vibrator rods and, hence, the distribution of the mass as well as the restoring force of membrane 2 and yokes 4 and 5.

As soon as rods 1 are damped by immersion into an attenuating medium, such as a liquid or a powdered plastic being filled in the container or withdrawn therefrom, the amplitude of the mechanical vibrations decreases. Thereby, the input voltage to amplifier 16 is also decreased. This results, in turn, in a diminution of the energy supplied to the exciting electromechanical transducer, so that the arrangement is de-energized in a short period of time. Thus, the output voltage of amplifier 16 decreases, and finally arrives at zero. The threshold value discriminator 17, connected to amplifier 16, responds when the voltage falls below a certain value, and causes relay 18 to reverse. This indicates that the tank or container is filled to a level at which vibrator rods 1 are immersed in the material in the tank.

When the level in the tank decreases below a predetermined level, rods 1 are uncovered. This makes it possible for the system, which is capable of vibration, to re-excite itself and, as soon as the output voltage of amplifier 16 again exceeds a predetermined value, the threshold value discriminator 17 restores relay 18 to its first position. This indicates that the level of the material in the tank, and which is to be monitored, has decreased below a predetermined level. Of course, relay 18 may also be utilized to control and activate certain functions through which it becomes possible, for example, to maintain the level to be monitored automatically at a constant value.

The described arrangement is always excited by an alternating voltage whose frequency coincides exactly with the prevailing natural resonance frequency of the respective mechanical vibratory system, so that maximum performance is assured. Manufacturing deviations, always present in mass production and resulting in somewhat different resonance frequencies of the various parts, have no harmful influence on the functioning of the apparatus. Similarly, changes in the resonance frequency due to fluctuating influences during operation are not detrimental.

The transmission of vibratory energy to the mounting means and to the tank or container wall is avoided due to the effective mechanical decoupling afforded by annular recess 14 between membrane 2 and tubular housing 3. In addition, by a favorable relation between the diameter of tubular housing 3 and the spacing of vibrator rods 1, corresponding to the lengths of yokes 4 and 5, the nodal or zero points of the system are located favorably, so that only a harmless portion of the vibratory energy is transmitted to tubular housing 3.

The described apparatus is suited particularly for determining the level of light bulk goods, such as powders and dusts. The level of such goods can be measured even when the cross sections and the widths of vibrator rods 1 are uniform over the entire length of these rods. In contrast thereto, a standing wave would be formed between the vibrator rods when the latter are used to measure the level of a liquid, so that the vibratory energy transmitted to the liquid would be reflected back to this system and the resultant end effect would be insufficient absorption of energy to attentuate the system adequately. An improvement can be attained by drilling holes 21' through the free ends of the vibrator rods. This provides for an exchange of liquid through the holes when the vibrator rods vibrate, so that energy is consumed by the friction at the edges of the holes and the eddy formation caused thereby.

The design shown in the drawing, with the wider and thinner blade portions 15 attached to the ends of the rods, works even better in this case. This has the effect that, when the vibrator rods vibrate, they perform, inasmuch as they are no longer so rigid, a motion partially opposing the direction of vibration, a so-called "swimming fin motion." The consequence is that an eddied flow builds up along the "fins," and enough energy is consumed to damp the vibrator rods greatly when they are immersed in the liquid. The "swimming fin effect" further prevents a standing wave from forming between the vibrator rods.

The mutual mechanical decoupling of the two electrical-mechanical transducers by the interspace 13 is necessary in order to prevent the vibratory energy being transmitted directly from the piezoelectric element 8 to the piezoelectric element 9. In such a case, the system would vibrate, as linked by the amplifier, not at the mechanical resonance frequency of the vibrator rods 1 but rather at a higher frequency, such as that of the tubular housing 3 and the membrane 2.

Figure 4:
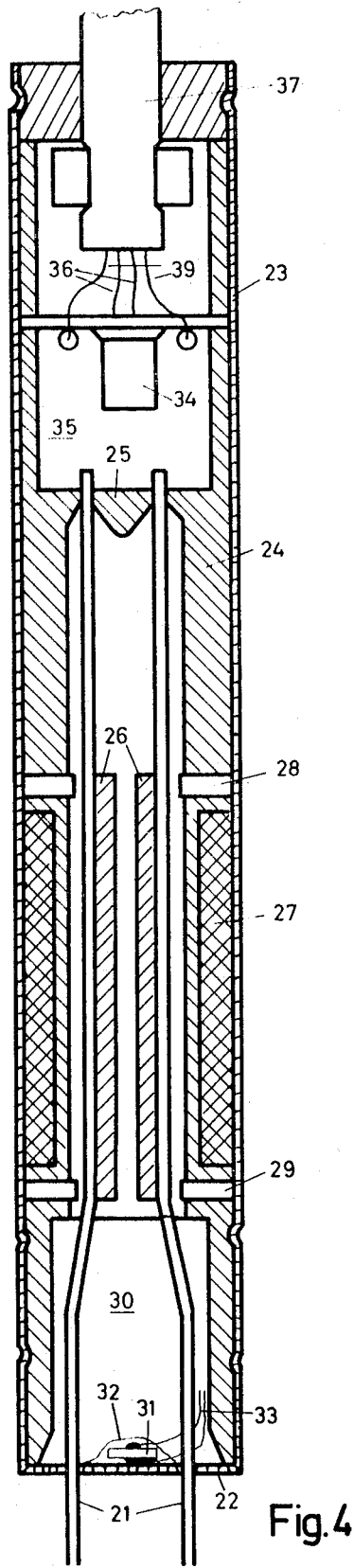
FIG. 4 is a vertical sectional view through a second embodiment of the invention.
Figure 5:
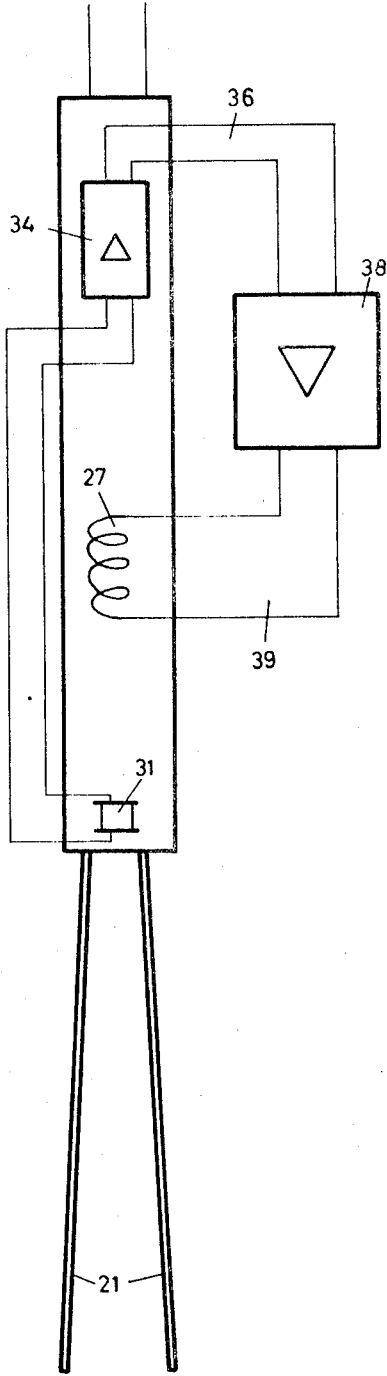
FIG. 5 is a schematic wiring diagram corresponding to FIG. 3.

In the embodiment of the invention shown in FIGS. 4 and 5, there are again two vibrator rods 21, whose design may be identical to that of the rods 1 of FIGS. 1, 2 and 3. However, the mounting of the rods and the excitation system are different. The mounting comprises a tubular housing 23 whose lower end is closed by a membrane 22. A holder 24 is disposed inside housing 23. Vibrator rods 21 again are rigidly secured to membrane 22, but they extend upwardly beyond this membrane for a considerable distance through the hollow interior of holder 24, with their upper ends being secured in a cross wall 25. Thus, each rod 21 is mounted in two places spaced from each other, namely in membrane 22 and wall 24.

Between these two bearing points, each vibrator rod 21 has secured thereto a rod-shaped soft iron armature 26. Armatures 26 are covered through almost their entire lengths by an electromagnetic winding 27 having annular magnet yokes 28 and 29 adjacent its opposite end faces. These magnet yokes, together with the magnetizable material of tubular housing 23, form an external magnetic circuit surrounding winding 27.

Above membrane 22, holder 24 is formed with an enlarged hollow space 30 containing a piezoelectric element 31 secured to membrane 22 between vibrator rods 21, piezoelectric element 31 being secured to membrane 22 by means of a plastic substance 32. The two electrodes of element 31 are connected through lines 33 to a preamplifier 34 in the form of an impedance adapter accommodated in a hollow space 35 at the upper end of tubular holder 24. Through the conductors 36 of the cable 37, preamplifier 34 is connected to the input of an amplifier 38 arranged outside the housing, and electromagnetic winding 27 is connected to the output of amplifier 38 through the outer cable conductors 39.

Amplifier 38 has a design such that it supplies direct current pulses to electromagnetic winding 27. The alternating magnetic field thereby produced results in the soft iron armatures 26 repelling each other because they have the same polarity, according to a principle similar to that of a soft iron instrument. A force which is oriented radially outwardly thus is exerted upon the parts of the vibrator rods 21 located between the two bearing points of each rod.

If the D.C. pulses applied to winding 27 have the same frequency as the natural resonance frequency of the vibrator rods, the rods are made to vibrate at their natural frequency. The vibratory motion of the rods causes flexures of membrane 22, thereby producing, at the terminals of piezoelectric element 31, an alternating voltage whose frequency again coincides with the natural resonance frequency of the mechanical vibratory system.

This alternating electrical voltage is supplied to the input of amplifier 38 through preamplifier 34, so that there is a self-energizing feedback energizing vibrator rods 21 to vibrate at the maximum possible amplitude in the system, as long as the vibrator rods are not damped.

The vibrations disappear as soon as vibrator rods 21 dip into the material contained in the tank or container. The disappearance of the vibrations is detected at the output of amplifier 38, in the same manner as in the embodiment of the invention shown in FIG. 3, by means of a threshold value discriminator. The system of FIGS. 4 and 5 also functions always at the natural resonance frequency of the vibrator rods 21, even when such natural resonance frequency changes, as long as the range of the changes is within the band width of amplifier 38. Consequently, the apparatus is largely independent of manufacturing tolerances and fluctuating environmental conditions.

What is claimed is:

1. In apparatus for determining the level of material in a container, and of the type including a pair of elongated vibratory members extending in spaced substantially parallel relation in the space in which the level is to be determined, vibrating means exciting mechanical natural vibrations of the vibratory members substantially 180° out of phase with each other, and vibration responsive means providing output signals as a function of the amplitude of vibrations of the vibratory members, the improvement comprising, in combination, means supporting said vibratory members with free end portions of substantial length extending into said space and vibratable independently of each other; a signal responsive means included in said vibrating means; a signal generating means included in said vibration responsive means; said signal generating means producing signals of an amplitude corresponding to the amplitude of said vibrations; and a feedback loop including an amplifier having an input connected to said signal generating means and an output connected to said signal responsive means, whereby said vibratory members are excited at a frequency matching exactly the natural resonance frequency of the mechanically vibrating system including said vibratory members, with the amplitude of vibrations of said vibratory members changing in accordance with the extent of the immersion of said free end portions in material in the container.

2. The improvement, as defined in claim 1, wherein said vibrating means is a first electro-mechanical transducer, and said vibration responsive means is a second electro-mechanical transducer.

3. In apparatus for determining the filling level of a container, and of the type including a vibratile means extending into the container, means exciting mechanical natural vibrations of the vibratile means, and signal means providing output signals as a function of the amplitude of vibration of the vibratile means: the improvement comprising, in combination, at least two parallel vibrator elements constituting said vibratile means; first electromechanical transducer means operatively associated with said elements and oeprable to excite said elements into vibrations of respective opposing senses; second electromechanical transducer means operatively associated with said elements and operable to excite said elements into electrical signals having amplitudes depending on the amplitudes of said vibrations; an amplifier having an input connected to the output of said second electromechanical transducer means and an output connected to said first electromechanical transducer means and to said signal means; said vibrator elements comprising vibrator rods; a membrane; each of said rods being fastened at one end to said membrane with the other ends being free and extending into the material whose level is being sensed; and two bridges interconnecting said rods and mechanically decoupled from each other; each of said bridges being coupled to one of said electromechanical transducers.

4. The improvement, as defined in claim 3, wherein each bridge comprises a yoke resting upon said membrane, and a stirrup spanning said yoke, and wherein said electro-mechanical transducers comprise piezoelectric elements, each piezoelectric element being clamped between one of said yokes and one of said stirrups associated with said yoke.

5. The improvement, as defined in claim 3, comprising a housing supporting said membrane, said membrane being decoupled, for mechanical vibrations, from said housing.

6. In apparatus for determining the filling level of a container, and of the type including a vibratile means extending into the container, means exciting mechanical natural vibrations of the vibratile means, and signal means providing output signals as a function of the amplitude of vibration of the vibratile means: the improvement comprising, in combination, at least two parallel vibrator elements constituting said vibratile means; first electromechanical transducer means operatively associated with said elements and operable to excite said elements into vibrations of respective opposing senses; second electromechanical transducer means operatively associated with said elements and transforming the vibrations thereof into electrical signals having amplitudes depending on the amplitudes of said vibrations; an amplifier having an input connected to the output of said second electromechanical transducer means and an output connected to said first electromechanical transducer means and to said signal means; each of said vibrator elements being a vibrator rod; means mounting each rod, adjacent one end thereof, at two points spaced along the rod with the other ends being free and extending into the material whose level is being sensed; and two magnetizable armatures, each arranged on a respective vibrator rod between the two mounting points thereof; said first electromechanical transducer means comprising a magnet winding acting upon said armatures.

7. In apparatus for determining the filling level of a container, the improvement claimed in claim 6, including a membrane; said vibrator rods extending through said membrane; said second electromechanical transducer comprising a piezoelectric element secured to said membrane.

8. The improvement, as defined in claim 6, wherein each armature is a rod-shaped soft iron member, said armatures being arranged in spaced parallel relation to each other and extending axially in the interior of said magnet winding.

9. In apparatus for determining the filling level of a container, and of the type including a vibratile means extending into the container, means exciting mechanical natural vibrations of the vibratile means, and signal means providing output signals as a function of the amplitude of vibration of the vibratile means: the improvement comprising, in combination, at least two parallel vibrator elements constituting said vibratile means; first electromechanical transducer means operatively associated with said elements and operable to excite said elements into vibrations of respective opposing senses; second electromechanical transducer means operatively associated with said elements and transforming the vibrations thereof into electrical signals having amplitudes depending on the amplitudes of said vibrations; an amplifier having an input connected to the output of said second electromechanical transducer means and an output connected to said first electromechanical transducer means and to said signal means; said vibrator elements comprising rods mounted at one end with the free end extending into the material whose level is being sensed, each rod having a blade-like enlargement on its free end, whereby the build-up of a standing wave between said rods in a filled container is inhibited.

10. The improvement, as claimed in claim 9, wherein said rods are tapered toward said enlarged portions, whereby the vibratory energy of said rods in a filled container is increasingly attenuated.

11. In apparatus for determining the filling level of a container, and of the type including a vibratile means extending into the container, means exciting mechanical natural vibrations of the vibratile means, and signal means providing output signals as a function of the amplitude of vibration of the vibratile means: the improvement comprising, in combination, at least two parallel vibrator elements constituting said vibratile means; first electromechanical transducer means operatively associated with elements and operable to excite said elements into vibrations of respective opposing senses; second electromechanical transducer means operatively associated with said elements and transforming the vibrations thereof into electrical signals having amplitudes depending on the amplitudes of said vibrations; an amplifier having an input connected to the output of said second electromechanical transducer means and an output connected to said first electromechanical transducer means and to said signal means; said vibrator elements comprising rods mounted at one end with the free end extending into the material whose level is being sensed, each rod having a blade-like enlargement on its free end.

References Cited

UNITED STATES PATENTS

| | | | |
|---|---|---|---|
| 2,808,581 | 10/1957 | Findlay | 73—290 UX |
| 2,910,999 | 11/1959 | Kimberly | 73—290 |
| 3,133,442 | 5/1964 | Werner | 73—290 |
| 3,368,213 | 2/1968 | Quinn | 340—244 |

FOREIGN PATENTS 1,013,186  12/1965  Great Britain.

LOUIS R. PRINCE, Primary Examiner

D. E. CORR, Assistant Examiner